Aug. 27, 1935.  E. F. FINCHAM  2,012,758
APPARATUS FOR THE OBJECTIVE DETERMINATION OF THE REFRACTION OF THE EYE
Filed Jan. 12, 1934  6 Sheets-Sheet 1

Inventor:
Edgar Frank Fincham
By
Attorney

Aug. 27, 1935.  E. F. FINCHAM  2,012,758
APPARATUS FOR THE OBJECTIVE DETERMINATION OF THE REFRACTION OF THE EYE
Filed Jan. 12, 1934   6 Sheets-Sheet 3

Aug. 27, 1935.  E. F. FINCHAM  2,012,758
APPARATUS FOR THE OBJECTIVE DETERMINATION OF THE REFRACTION OF THE EYE
Filed Jan. 12, 1934  6 Sheets-Sheet 4

Inventor:
Edgar Frank Fincham
By
Attorney

Aug. 27, 1935.   E. F. FINCHAM   2,012,758
APPARATUS FOR THE OBJECTIVE DETERMINATION OF THE REFRACTION OF THE EYE
Filed Jan. 12, 1934   6 Sheets-Sheet 5

Inventor:
Edgar Frank Fincham

Aug. 27, 1935.  E. F. FINCHAM  2,012,758
APPARATUS FOR THE OBJECTIVE DETERMINATION OF THE REFRACTION OF THE EYE
Filed Jan. 12, 1934  6 Sheets—Sheet 6

Inventor:
Edgar Frank Fincham
By
Attorney

Patented Aug. 27, 1935

2,012,758

UNITED STATES PATENT OFFICE 2,012,758

APPARATUS FOR THE OBJECTIVE DETERMINATION OF THE REFRACTION OF THE EYE

Edgar Frank Fincham, Hornsey, London, England

Application January 12, 1934, Serial No. 706,426
In Great Britain January 24, 1933

22 Claims. (Cl. 88—20)

This invention concerns improvements in apparatus for measuring the refraction of the eye and relates more particularly to that form of apparatus comprising an illuminating lamp, a projection lens and a target or apertured diaphragm mounted between the lamp and lens.

In the simplest form of apparatus of this character light after passing the lens is reflected into the subject's eye by a mirror or prism and determination of the refraction is effected by adjusting the target so as to give a sharp image on the retina. This image may be viewed by means of some form of telescope. In this simple apparatus the accuracy obtained depends upon the observer's judgment of exact focus.

A further instrument of similar character designed to obviate the disadvantage mentioned uses the same elements but the source of light is displaced slightly from the axis of the lens whereas the observing system is placed upon the said axis This system is employed to observe the image that has been produced on the retina by the projection lens. All the light which enters the eye from the target does so through a decentred part of the pupil. If the target is placed at a point conjugate to the retina, its image upon the latter will be sharply focussed and will fall upon the axis whereas if it is too far away or too near the light will either cross the axis in the eye or will fail to reach it on reaching the retina and the image will be displaced to one side or the other. Adjustment is made by moving the target along the axis until the image on the retina is seen to disappear behind the lines of the target. The disadvantages of this instrument are that it is difficult to judge exact coincidence between the retinal image and the line on the target and that a considerable range exists between the disappearance of the image on one side of the target lines and its reappearance on the other side.

The present invention provides improved objective apparatus which is similar to the last mentioned instrument in that the source of light is decentred from the axis of the instrument but differs therefrom in that the target does not appear in the field of observation and hence does not mask the retinal image.

According to the invention provision is made of an instrument wherein the axis of the observing system is preferably on the axis of the eye but separate from the common axis of the lens and target, the observing system comprising optical means such as prisms whereby the observed retinal image is divided into two or more parts shifted or reversed with respect to one another.

Thus if the image is decentred to the right the observed reversed half (assuming the observed image to be divided into two parts) will be decentred to the same extent to the left. Correct setting is effected when the image is central and the two observed halves are in alignment. The accuracy in this method is very high because the effect of reversing one half of the image is to double the apparent effect of an error in the setting.

In the accompanying illustrative drawings:—

Figures 1, 2:
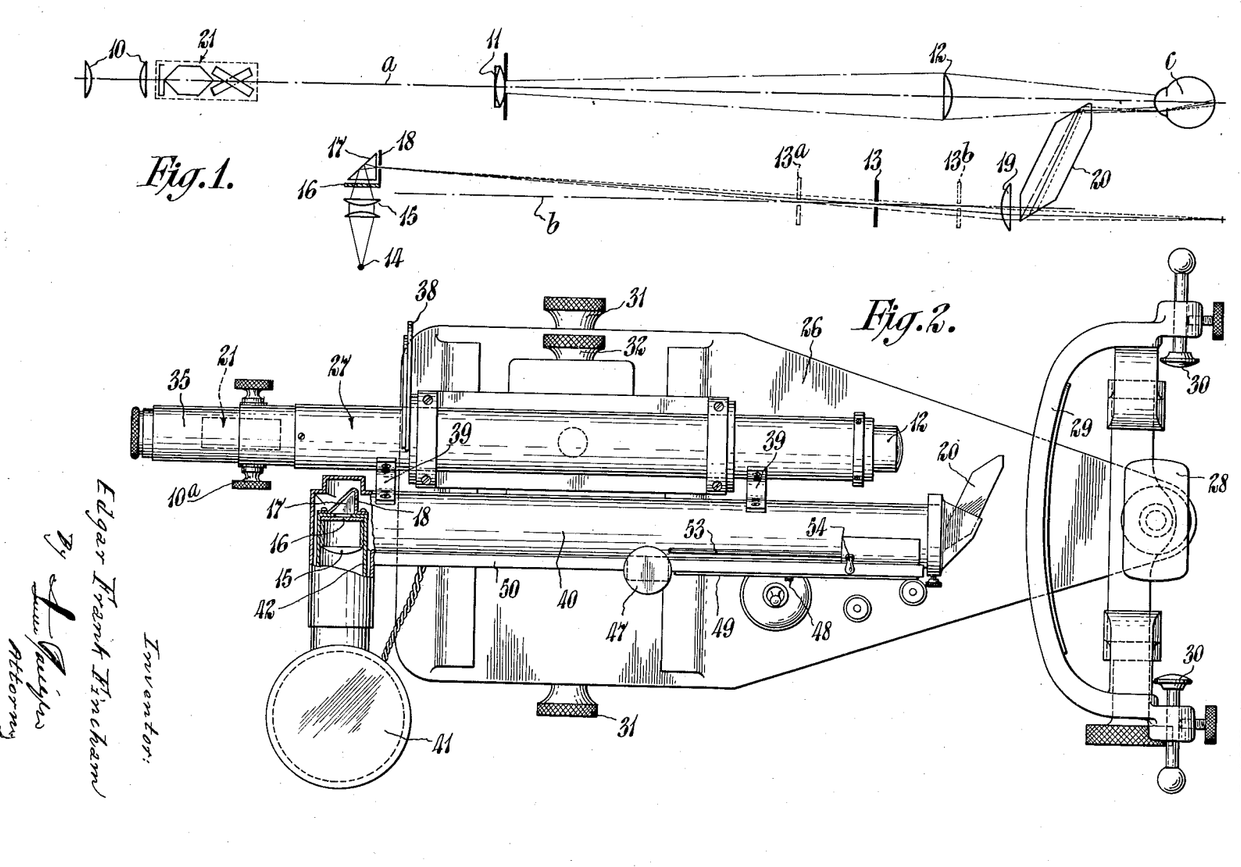
Fig. 1 is a diagram of the optical arrangement of the instrument.
Fig. 2 is a plan view, partly in section, of a convenient constructional form of the instrument, whilst

Referring to Fig. 1, $a$ represents the axis of the observing telescope formed by the eye-piece lenses 10 and lenses 11 and 12, while $b$ represents the axis of the illuminated target 13 which is movable between the limits of the points 13$a$ and 13$b$. Light from a suitable source 14 passes through condensing lenses 15 and a colour filter 16, preferably green, and is reflected by a prism 17 through a slotted diaphragm 18 and illuminates the target 13.

The light passing through the target 13, which may consist of a slotted disc having a hair-line extending across the slot, proceeds by way of a projection lens 19 to a rhomboid prism 20 which serves to reflect the light passing through the target into the eye $c$ of the patient at a point slightly displaced from the centre of the pupil.

The light emitted from the slotted diaphragm 18 is slightly displaced from the axial line $b$ of the target system, and the arrangement is such that with the target 13 placed at the normal or mid position shown in full lines, the light passing therethrough, after reflection by the rhomboid prism 20 forms an image of the target 13 upon the retina of the eye $c$, which image if the eye is normal or emmetropic will lie upon the axial line $a$ of the observing system 10, 11 and 12, but in other cases will lie to one side or other of the said axial line. The image thus formed upon the retina of the eye $c$ is viewed by the observing system 10, 11 and 12.

Figure 8:
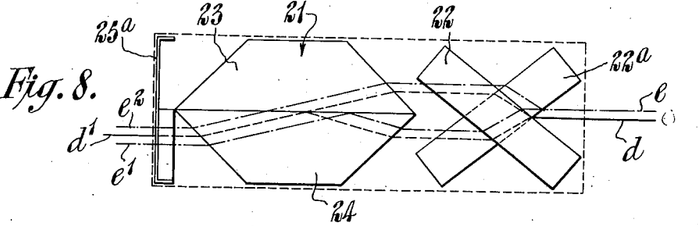
Figs. 8, 9 and 10 show in plan, side elevation and end view respectively, an optical arrangement forming part of the observing system.
Figure 9:
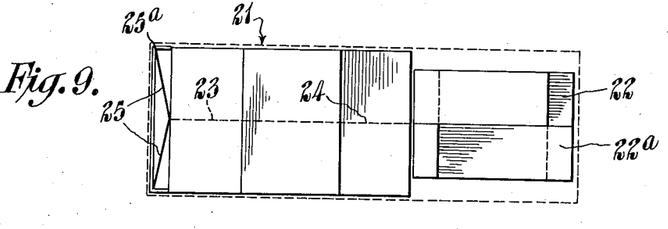
Figure 10:
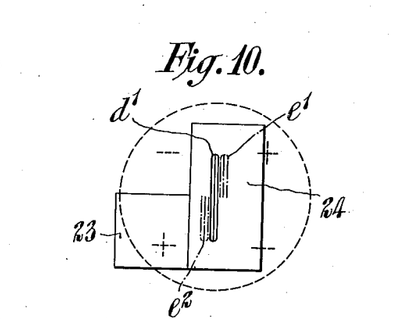

Situated between the eyepiece lenses 10 and the lens 11 is an image-dividing arrangement 21 of prisms and refracting plates shown more particularly in Figs. 8, 9 and 10. This arrangement 21 comprises two parallel-sided plates of glass 22, 22$a$ inclined with respect to the axis $a$ and with each other and a pair of prisms 23, 24, the prism 24 having twice the height of the prism 23. Two further thin prisms 25 are arranged as shown together with a suitable screen 25$a$ which may carry $+$ and $-$ signs or other markings for use in setting the instrument. These prisms are placed in the focal plane of the eyepiece lenses 10.

As shown in Fig. 8, light entering the image-dividing arrangement along the axis of the observing system and indicated at $d$ is divided into two halves by the plates 22, 22$a$ and after being refracted thereby passes to the prisms 23, 24, the light from the plate 22 passing through the prism 24 only, while that from the plate 22$a$ passes through both of the prisms 23 and 24, the ultimate effect being that the two divided images are again brought into line and appear as an unbroken image at $d'$ if the eye is emmetropic.

If however the light is displaced to either side by reason of the eye being myopic or hypermetropic, as indicated by the line $e$, the light after refraction by the plates 22, 22$a$ enters the prisms 23, 24 and emerges therefrom as two half images displaced from one another as shown at $e'$ and $e^2$. The merging of the two halves is effected by altering the position of the target 13 in order to bring the light image formed upon the retina of the eye $c$ into register with the axial line $a$ of the observing system. The amount of displacement from the normal of the target 13 is a measure in diopters of the refraction of the eye $c$ and the instrument may be calibrated accordingly.

The two thin prisms 25 are placed in the path of the light image after it emerges from the prisms 23, 24 and serve to eliminate haziness of the image that occurs in the region of the point of division.

Referring now to Figs. 2–6, a preferred constructional form of instrument comprises a base plate 26 having mounted thereon at one end the observing apparatus 27 and at the opposite end an adjustable chin-rest 28 together with a forehead rest 29 which may be provided with adjustable side or temple pads 30.

Figure 3:
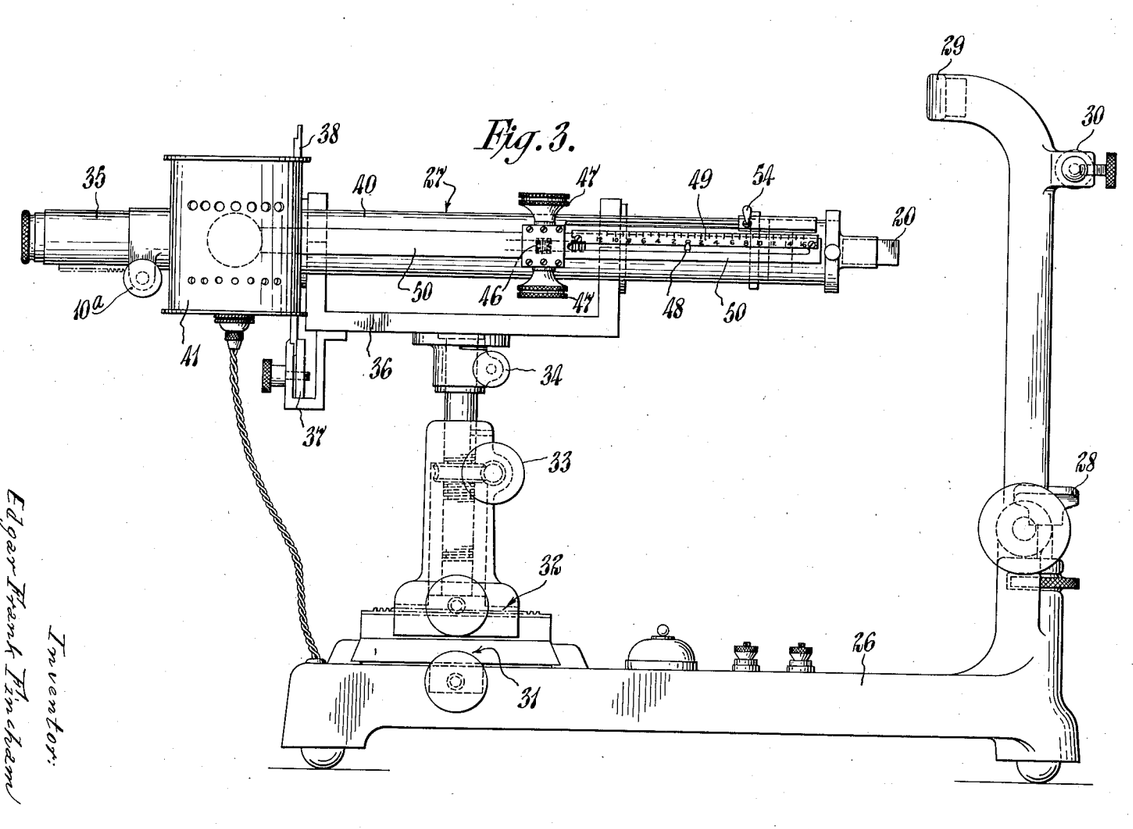
Fig. 3 is a side elevation thereof.
Figure 4:
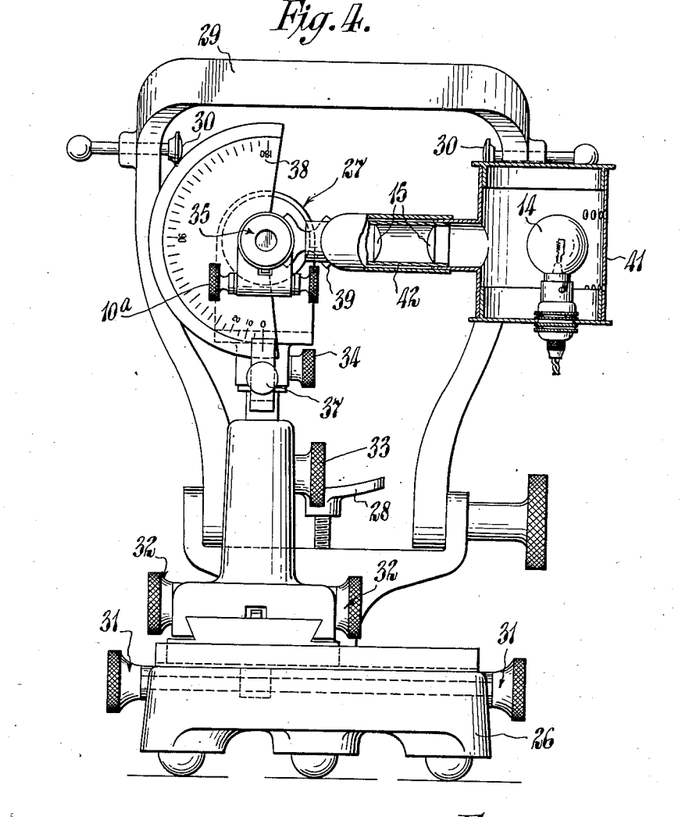
Fig. 4 is an end view, also partly in section.

The apparatus 27 is adjustably mounted as at 31, 32 to be movable in both lateral and longitudinal directions, while means such as shown at 33 are provided for raising and lowering the apparatus. To permit of axial alignment suitable pivot and clamping means as shown at 34 are provided.

The observing telescope 35 contains the eyepiece lenses 10, which are adjustable by means of the knob 10$a$, together with the lenses 11 and 12 and forms the axis $a$ of Fig. 1. The telescope 35 is rotatably mounted in a bracket 36 fixed to the supporting means previously described and is arranged to be capable of rotation through an arc of 180° to enable measurements to be made in different meridians, and clamping means 37 in co-operation with a suitably marked sector plate 38 fixed to the telescope 35 serve to hold it in any desired position.

Arranged parallel to the telescope 35, and secured thereto by brackets 39 is the target and illuminating tube 40 carrying at one end the rhomboid prism 20 and having at its opposite end a further tube at right angles thereto and serving to support a lamp chamber 41. The lamp chamber 41 carries the light source 14, comprising an electric lamp, the filament of which is arranged to lie in line with the condensing lenses 15 housed in an adjustable manner in the tube 42. This tube 42 also carries the filter 16, prism 17 and slotted diaphragm 18.

The target 13 (see more particularly Figs. 5 and 6) is carried by a sliding tube 43 within the target tube 40 and is arranged to be adjusted as to position by means of a rack 44 secured thereto and extending outwardly through a slot 45 in the tube 40, to engage a pinion 46 operated by the knobs 47.

A suitable pointer 48 (Fig. 3) is secured to the tube 43 and co-operates with a scale 49 secured to a housing 50 covering the rack 44 and formed integral with the tube 40.

Figure 5:
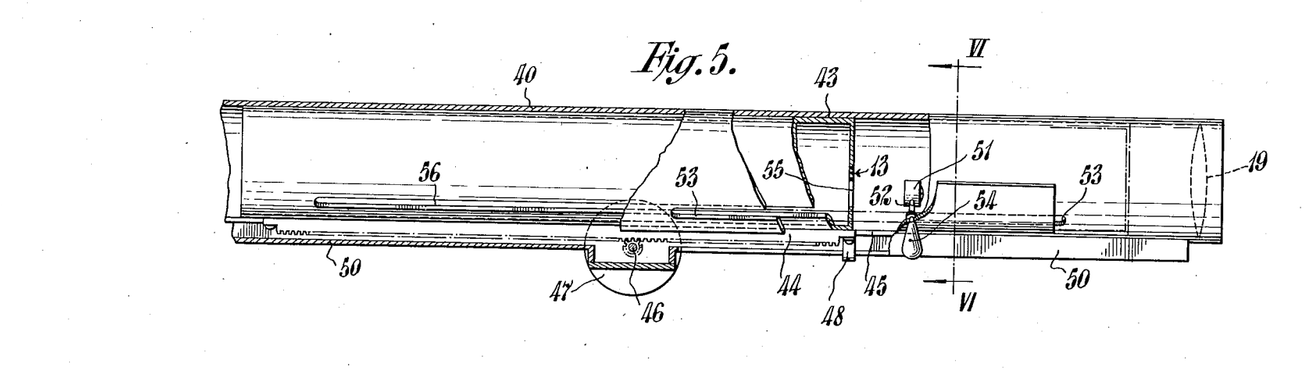
Fig. 5 is an enlarged view, partly cut-away showing the target mechanism.
Figure 6:
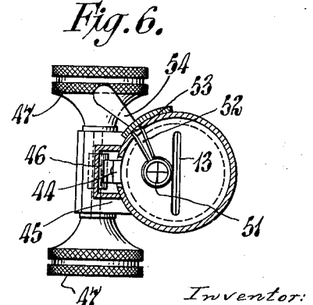
Fig. 6 is a section on the line VI—VI of Fig. 5.

For the purpose of fixing the accommodation of the eye of the patient, an auxiliary target 51 is arranged to move over approximately the same range as the target 13 and is formed as a small translucent disc carrying cross wires or other device, and adapted to be illuminated by light from the source 14. The auxiliary target 51 is carried by an arm 52 extending outwardly through a slot 53 in the tube 40 and terminates in a handle and guide-plate 54.

In order to allow the passage of the auxiliary target 51 to both sides of the target 13, a slot 55 is formed in the said target 13 and a slot 56 in the wall of the tube 43 in register with the slot 53 in the wall of the tube 40.

Figure 7:
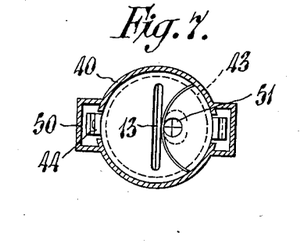
Fig. 7 is a view similar to Fig. 6 showing a modification of an auxiliary target arrangement.

Fig. 7 shows a modification of the auxiliary target arrangement wherein the tube 43 carrying the main target 13 is divided into two parts, one carrying the target 13 and the other the auxiliary target 51 formed as a translucent opening illuminated from behind by a separate source of light, the intensity of which can be controlled independently of that of the main source 14. In this construction rack means similar to those previously described may be used for adjusting the auxiliary target.

Figure 11:
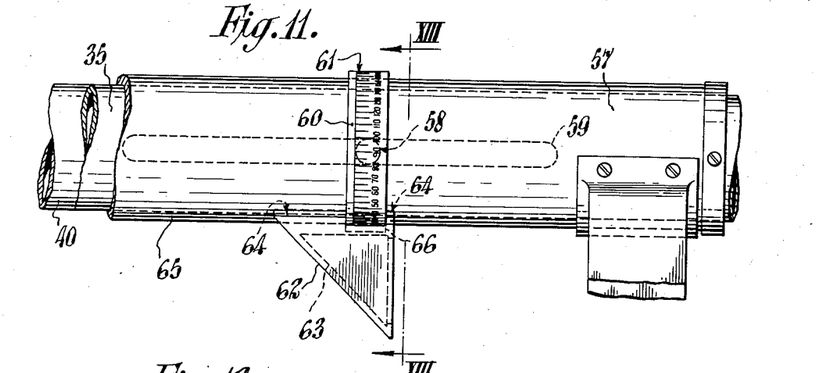
Fig. 11 shows in side elevation a modified construction of scale reading mechanism.
Figure 12:
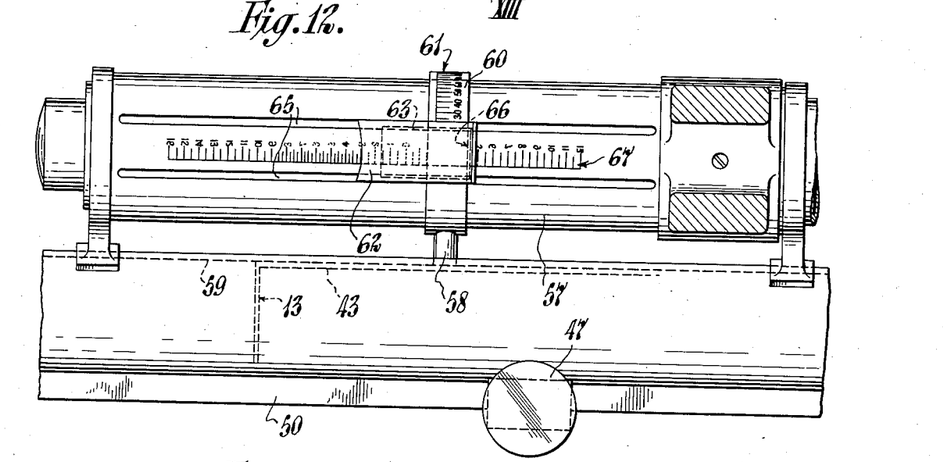
Fig. 12 is an underside plan view thereof.
Figure 13:
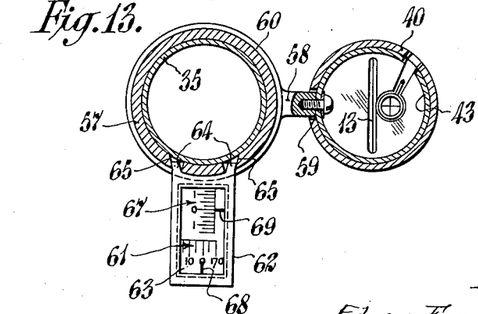
Fig. 13 is a section on the line XIII—XIII of Fig. 11.

Figs. 11, 12 and 13 show a modified construction whereby both the scale of target movement and the angle of rotation of the apparatus 27 about the axis $a$, may be read from the eyepiece end of the telescope 35.

In this arrangement the telescope 35 is rotatably mounted within a thick walled tube 57 forming part of the main supporting member and taking the place of the bracket 36. As previously described, the target tube 40 is arranged parallel to and carried by the telescope 35, but in this instance the tube 43 carrying the target 13 is arranged to be connected to a stud 58 which extends outwardly through a slot 59 in the target tube 40 and terminates in a ring member 60.

The ring 60 surrounds the tube 57 and is provided with a scale 61. It will be seen that the ring 60 rotates about the tube 57 when the apparatus 27 is angularly adjusted, and traverses a part of its length according to the setting of the target 13 carried by the tube 43.

A casing 62 carrying a prism 63 is slidably mounted upon the underside of the tube 57 by means of lugs 64 engaging in slots 65. The ring 60 engages a slot 66 formed in the casing 62 and in consequence the prism 63 is moved in accordance with the axial movement of ring 60 over a scale 67 provided on the underside of the tube 57.

In operation the scale 61 indicating the angular setting of the apparatus is viewed by reflection in the prism 63 and is read in conjunction with an index line 68 engraved on the horizontal face of the prism. The setting of the target 13 causes the ring member 60 to move the prism carrier 62 along the tube 57 and the scale 67 is also viewed by reflection in the prism 63 and is read in conjunction with a second index line 69 engraved on the horizontal face of the prism.

Suitable means of illuminating the two scales may be employed, and if desired a second eyepiece may be mounted below that of the telescope 35 for viewing the scales, in which case it is preferred to use lenses of such power that the adjusting knob 10a may be coupled to both eyepieces to secure simultaneous adjustment. The extra source of light may be controlled if desired by a push-button.

Figure 14:
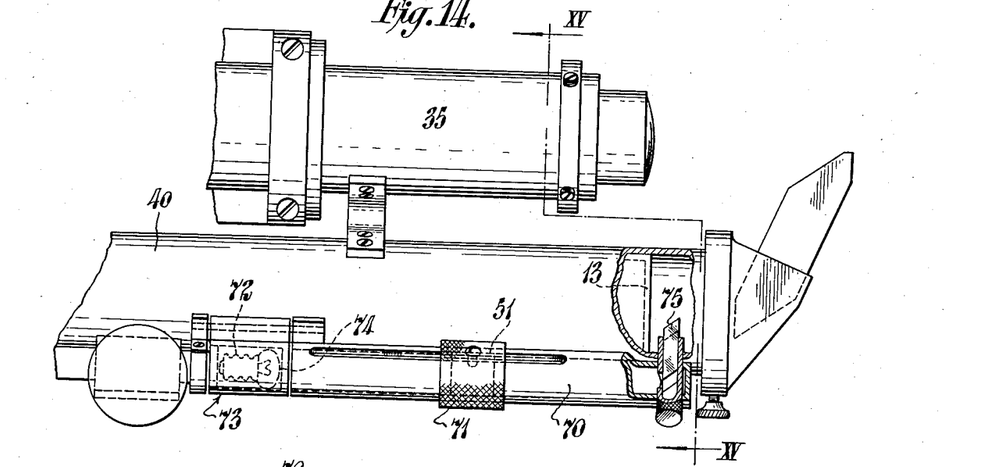
Fig. 14 shows in part sectional plan a further modification of the main and auxiliary target arrangement whilst
Figure 15:
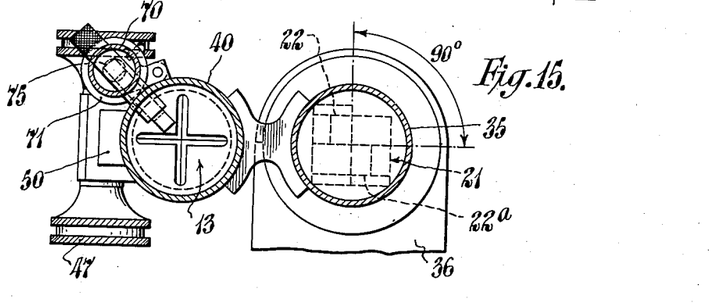
Fig. 15 is a cross section on the line XV—XV of Fig. 14.

Figs. 14 and 15 show a modified construction in which the target 13 is in the form of a cross instead of a single hair line, the auxiliary target 61 being carried in a separate tube 70 fixed to the outside of the main target tube 40, while the eyepiece of the telescope 35 with the optical system 21 carried thereby is arranged to be rotated about its axis through an arc of 90°. The auxiliary target 51 is adjustable by means of the knurled grip 71 and is illuminated by a separate source of light, such as a small electric bulb 72 carried in a hinged mounting 73. The light from the bulb 72 passes through a diffusing medium 74 to illuminate the auxiliary target 51, the light emitted therefrom being reflected into the main target tube 40 by means of an adjustably mounted rhomboid prism 75.

This modified arrangement is for the purpose of allowing easy determination of the principal meridians of an astigmatic eye, i. e. the meridians of greatest and least power respectively. The image of the cruciform target upon the retina of the patient's eye is viewed as before by means of the telescope 35, and for the measurement of the refractive power the line of the target which is perpendicular to the plane containing the axes of the illuminating and observing systems is observed by placing the eyepiece tube 35 containing the prism system 21 in its original position so that this line is divided in its length.

Should the instrument be positioned so that the axes of the illuminating and observing systems do not lie upon one of the principal meridians of an astigmatic eye the retinal image will suffer an oblique displacement which could not be ascertained in the image of the single-line target hereinbefore described with reference to Figs. 2–7. In such case, however, the retinal image of the other target line, which lies exactly in the plane containing the illuminating and observing systems, will be displaced from that plane. Such a displacement is ascertained by rotating the eyepiece tube and the prism system through 90° so that that line of the image is now divided in its length and, due to the properties of the observing system, appears as a broken line. In the practical use of this modified form of the instrument it is adjusted for this observation first, and is rotated in its bracket 36 until a position is found in which the image line used for meridian setting is seen to be unbroken. The instrument will then lie in the plane of one of the principal meridians of the eye. The eyepiece tube and prism arrangement are then rotated through 90° in order to allow the measurement of the refraction to be made in that meridian. For the measurement of the refraction of the other principal meridian the instrument is rotated in its bracket 36 through 90°.

In each position of the eyepiece and prism arrangement the line of the image not in use is eliminated by means of the two prisms 25.

Figure 16:
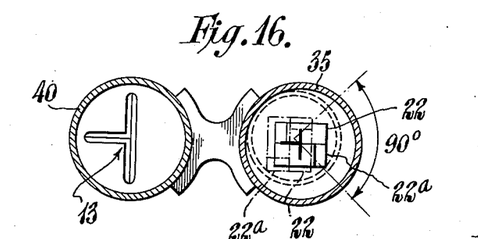
Fig. 16 shows a modified form of the arrangement shown in Figs. 14 and 15.

Fig. 16 shows a modified form of the arrangement of Figs. 14 and 15 in which a T-shaped target 13 is used in conjunction with a rotatable eyepiece and prism system 21 mounted eccentrically of the axis of the observing telescope 35.

In the arrangement shown in Figs. 14 and 15 and referring to the optical arrangement shown in Fig. 1 it will be apparent that when using the cruciform target it may be necessary for the light therefrom to enter the eye c considerably decentred in order to retain a reasonable length of horizontal limb on the right hand side of the cross (Fig. 15), more particularly when the target 13 is in the extreme position 13b (Fig. 1) owing to the loss caused by the termination of the reflecting surface of the prism 20, to permit the observation of the retinal image by means of the telescope 35.

In the arrangement shown in Fig. 16, the vertical line of the target is used to measure the refraction as previously described with the image-dividing system 21 in the position shown in full lines. To determine the principal meridians the telescope eyepiece and system 21 are made capable of rotation through 90° and owing to the eccentric mounting thereof, the system 21 and the point of division of the viewed image caused by the two plates 22, 22a is swung across to bisect the horizontal limb of the target as shown in chain dotted lines.

I claim:

1. Apparatus for the purpose set forth, comprising a source of light, a lens, a target movably mounted between the said source and lens, and an observing system having its axis separate from the common axis of the lens and target, said observing system including image-dividing means formed by a pair of parallel-sided glass plates at an angle to one another and a pair of co-operating prisms.

2. Apparatus according to claim 1 having an additional pair of thin prisms at the outer ends of the pair of prisms forming part of said image-dividing system.

3. Apparatus for the purpose set forth, comprising a source of light, a lens, a target between said source and lens, a rhomboid prism to direct light from said target and lens into a patient's eye at a decentred part thereof, and an observing system having its axis separate from the common axis of the lens and target and comprising image-dividing prisms.

4. Apparatus for the purpose set forth, comprising a source of light, a lens, a target movably mounted between said source and lens, said target producing a cruciform image on the retina of a patient's eye, and an observing system having its axis separate from the common axis of the lens and target, said observing system comprising means for dividing said image into two relatively-reversed parts and being provided with an adjustment whereby the principal meridians of an astigmatic eye may be determined.

5. Apparatus for the purpose set forth, comprising a source of light, a lens, a target movably mounted between said source and lens, said target producing a T-shaped image on the retina of a patient's eye, and an observing system having its axis separate from the common axis of the lens and target, said observing system comprising means for dividing said image into two relatively reversed parts and being provided with an adjustment whereby the principal meridians of an astigmatic eye may be determined.

6. Apparatus for the purpose set forth comprising a base plate, an adjustable support carried by said base, an observing system angularly adjustable on said support for inspecting the retina of an eye through a single area of the pupil thereof, said observing system comprising an eyepiece and an image-dividing arrangement, and an image-producing system for producing an image of a target upon the retina carried by said observing system comprising a source of light, a lens, a prism, and a target movably mounted between said lens and source, the common axis of said lens and target being separate from the axis of the observing system.

7. Apparatus for the purpose set forth, comprising a base, a pillar adjustable on said base, an observing system journalled on said pillar, said system including an eyepiece and an image-dividing arrangement, a tube carried by said observing system and itself carrying a source of light at one end and a prism at the other end, the axis of said tube being parallel to the axis of the observing system, and a lens and target axially mounted within said tube, said target being provided with means extending externally of the tube for adjusting its position with relation to the lens.

8. Apparatus according to claim 7 having on the base-plate a patient's head-rest.

9. Apparatus for the purpose set forth, comprising a base, a pillar adjustable on said base, an observing system journalled on said pillar, said system including an eyepiece and an image-dividing arrangement, a tube carried by said observing system and itself carrying a source of light at one end and a prism at the other end, the axis of said tube being parallel to the axis of the observing system, a lens fixed axially within said tube, a target movably mounted within said tube, means extending externally of the tube for adjustment of the position of said target, and means for indicating the adjustment of said target.

10. Apparatus for the purpose set forth, comprising a base, a pillar adjustable on said base, an observing system journalled on said pillar, said system including an eyepiece and an image-dividing arrangement, a tube carried by said observing system and itself carrying a source of light at one end and a prism at the other end, the axis of said tube being parallel to the axis of the observing system, a lens fixed axially within said tube, a main target in said tube adjustably mounted with relation to said lens, an auxiliary target similarly adjustable within said tube, and means extending externally of the housing for independent adjustment of said targets.

11. Apparatus for the purpose set forth, comprising a source of light, a target illuminated by said source, optical means for transmitting an image of said target to the retina of an eye, means for observing said image on the retina through a single area of the pupil of said eye, and means associated with said observing means for dividing the retinal image for observation into at least two parts reversed one with respect to the other.

12. Apparatus for the purpose set forth, having an illuminating system comprising a source of light, a lens, and a target mounted between the said source and lens, said illuminating system producing a beam of light entering the patient's eye at a decentered part thereof to produce an image of said target on the retina of said eye, means for observing said image on the retina through a single area of the pupil of said eye, and means associated with said observing means for dividing the retinal image for observation into at least two relatively reversed parts.

13. Apparatus for the purpose set forth, having an illuminating system comprising a source of light, a lens, and a target mounted between the said source and lens, said lens forming an image of said target on the retina of the patient's eye, means for observing said image through a single area of the pupil of said eye, said means including image-dividing means, and a journal bearing whereby the illuminating system and observing means may be adjusted about the axis of the said observing means.

14. Apparatus for the purpose set forth, having an illuminating system comprising a source of light, a lens, a target between said source and lens, and a color filter, said lens producing an image of said target on the retina of a patient's eye, and an observing system including means for dividing the observed retinal image into at least two relatively reversed parts.

15. Apparatus for the purpose set forth, comprising a source of light, a main target, an auxiliary target mounted so as to be movable independently of the main target, said two targets being illuminated by said source, optical means for transmitting images of said targets to the retina of a patient's eye, and an observing system comprising means whereby the retinal image of the main target is divided into at least two relatively reversed parts.

16. Apparatus for the purpose set forth, comprising a source of light, a lens, a target movably mounted between said source and lens, said lens producing an image of said target on the retina of the eye under test, and an optical system for observing said image through a single area of the pupil of said eye, said system comprising image-dividing means and a screen having denotations for determination of the meridian of observation.

17. Apparatus for the purpose set forth, having an illuminating system comprising a source of light, a lens, and a target mounted between said source and lens, said system producing an image of said target on the retina of the eye under test, means for dividing said image for observation into two reversed parts, an observing eyepiece, and optical means whereby at least one of the relative settings of the target and lens can be read at said eyepiece.

18. Apparatus for the purpose set forth, comprising a source of light, a target, means for forming an image of said target on the retina of an eye under test, viewing means adapted to allow observation of said image through a single area of the pupil of said eye and along an axis inclined in one plane to the axis of the beam of light within the said eye produced by said image-forming means, means for causing said axes to intersect on the retina, and an optical device associated with said viewing means to divide the said image into two parts reversed one with respect to the other.

19. Apparatus for the purpose set forth, comprising a source of light, a target, means for forming an image of said target on the retina of an eye under test, viewing means adapted to allow observation of said image through a single area of the pupil of said eye and along an axis inclined in one plane to the axis of the beam of light within the said eye produced by said image-forming means, said target including a line inclined to said plane, means for causing said axes to intersect on the retina, and an optical device associated with said viewing means to divide the said image into two parts reversed one with respect to the other.

20. Apparatus for the purpose set forth, comprising a source of light, a target, means for forming an image of said target on the retina of an eye under test, viewing means adapted to allow observation of said image through a single area of the pupil of said eye and along an axis inclined in one plane to the axis of the beam of light within the said eye produced by said image-forming means, said target including a line lying in said plane, means for causing said axes to intersect on the retina, and an optical device associated with said viewing means to divide the said image into two parts reversed one with respect to the other.

21. Apparatus for the purpose set forth, comprising a source of light, a target, means for forming an image of said target on the retina of an eye under test, viewing means adapted to allow observation of said image through a single area of the pupil of said eye and along an axis inclined in one plane to the axis of the beam of light within the said eye produced by said image-forming means, means for causing said axes to intersect on the retina, and an optical device associated with said viewing means to divide the said image along a line parallel to said plane into two parts reversed one with respect to the other.

22. Apparatus for the purpose set forth, comprising a source of light, a target, means for forming an image of said target on the retina of an eye under test, viewing means adapted to allow observation of said image through a single area of the pupil of said eye and along an axis inclined in one plane to the axis of the beam of light within the said eye produced by said image-forming means, said target including a line at an angle to said plane, means for causing said axes to intersect on the retina, and an optical device associated with said viewing means to divide the said image along a line parallel to said plane into two parts reversed one with respect to the other.

EDGAR F. FINCHAM.